Aug. 13, 1946.  M. WATTER  2,405,917
STRUT ELEMENT AND JOINT
Filed Jan. 28, 1943  2 Sheets-Sheet 1
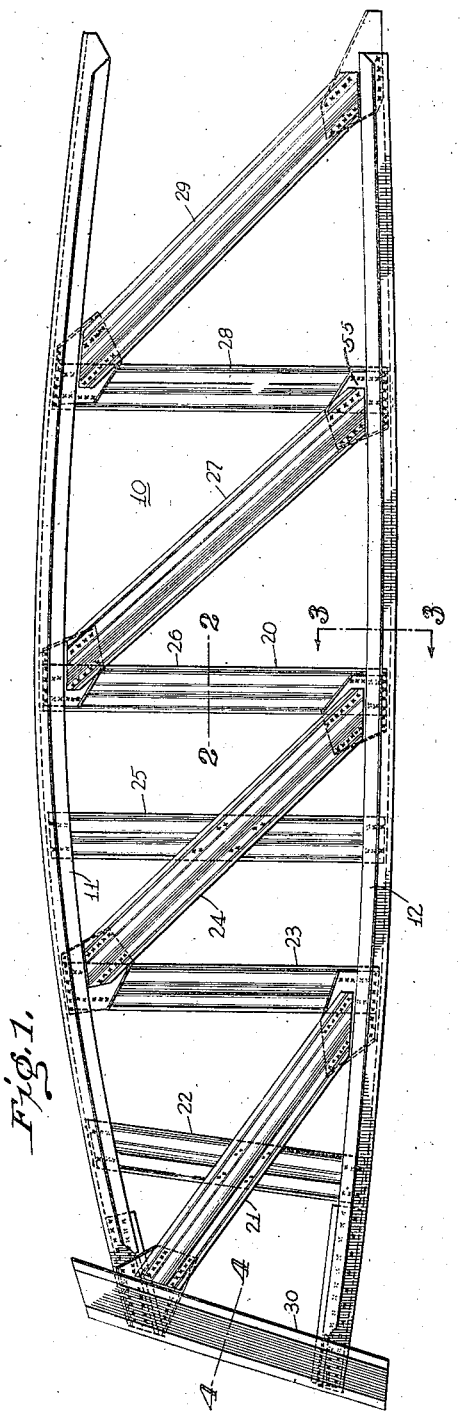
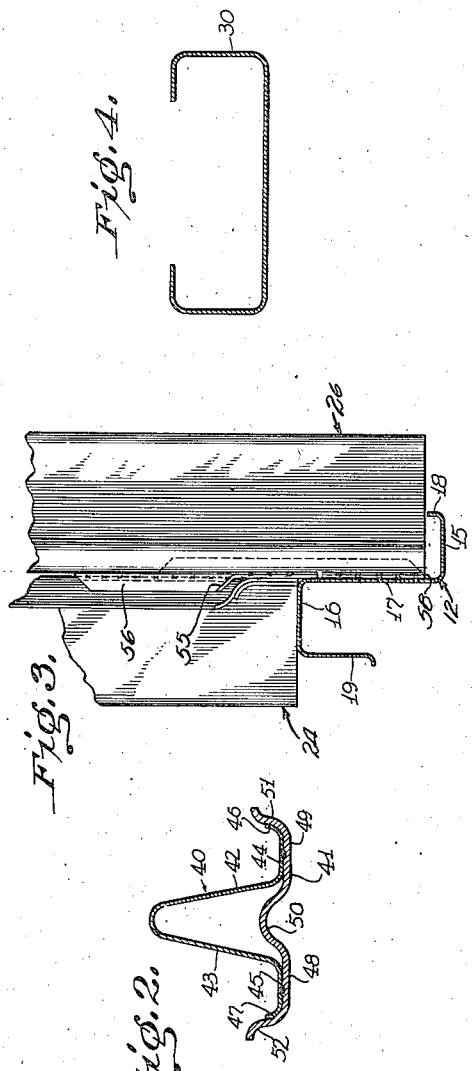
INVENTOR
Michael Watter
BY John P. Farber
ATTORNEY Aug. 13, 1946.    M. WATTER    2,405,917
STRUT ELEMENT AND JOINT
Filed Jan. 28, 1943    2 Sheets-Sheet 2

INVENTOR
Michael Watter
BY
ATTORNEY

Patented Aug. 13, 1946

2,405,917

UNITED STATES PATENT OFFICE 2,405,917

STRUT ELEMENT AND JOINT

Michael Watter, Philadelphia, Pa., assignor to Edward G. Budd Manufacturing Company, Philadelphia, Pa., a corporation of Pennsylvania Application January 28, 1943, Serial No. 473,809

4 Claims. (Cl. 189—37)

This invention relates to airplanes and more particularly to the rib structures adapted for the main load carrying function of an airfoil.

In airplane construction the balancing of tensional, compressional, and shearing forces forms a problem of highest importance and of considerable complexity. This problem is accentuated where structural elements are of light weight materials and loads of considerable size are involved. Particularly in wing construction it is important that unnecessary shearing or other forces be reduced so that the strength of the assembly may not be impaired.

It is accordingly an important object of the invention to reduce the shear and bending force movements on airfoil structure. Another object is to centralize as far as possible the mass distribution of the truss structure within a common plane of symmetry. Still another object is the construction of truss members having a mass center closely adjacent one side thereof. Still another object is the provision of truss members of such construction as to serve satisfactorily either as diagonal or vertical truss members.

An object of the invention includes means for joining diagonal and vertical truss members so as tend toward equalization of movements of inertia about the common intervening plane. Another object contemplated is to provide means for insuring rigid assembly of truss diagonals, verticals and rib cap strip. An object also is to facilitate welding operations in rib construction. The above objects are accomplished in the invention as outlined in the following detailed description of an illustrative embodiment thereof, and as shown in the accompanying drawings in which:

Fig. 1 is a side elevational view of an airfoil rib structure;

Fig. 2 is an enlarged detail section on line 2—2 of Fig. 1;

Fig. 3 is an enlarged sectional and elevational detail along lines 3—3 of Fig. 1;

Fig. 4 is an enlarged sectional detail along lines 4—4 of Fig. 1;

Figure 5:
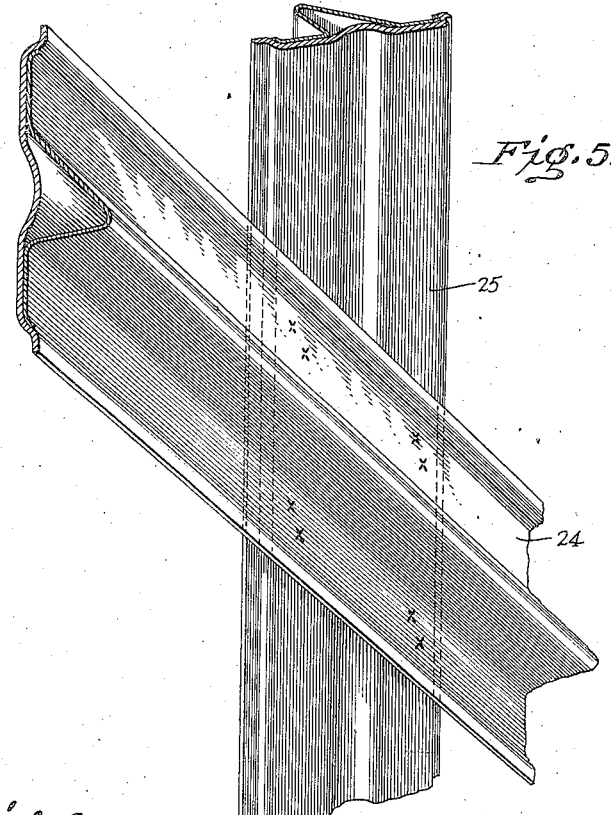
Fig. 5 is an enlarged perspective of the cross joint between diagonal and vertical truss members.

Referring to Fig. 1, I have shown my invention as applied to an airplane rib structure 10 having top and bottom chord members or chords 11 and 12 of a curvature predesigned for effective air lift and air flow.

As Fig. 3 shows, the chord is formed of flat offset lower and higher lateral sections 15 and 16, joined by a vertical web 17. The lateral sections 15 and 16 terminate in reversely turned flanges 18 and 19, the flange 18 adjoining section 15 being short, while flange 19 adjoining section 16 is comparatively longer.

Interposed between the spaced chords 11 and 12 are the chord support members or struts, generally indicated by the numeral 20, and including members 21, 22, 23, 24, 25, 26, 27, 28, and 29. These members function primarily as compression elements. As appears from Fig. 1, the struts 20 are both of the vertical type as at 22, and of the diagonal type as at 24, the diagonal struts 21, 24, 27 and 29 forming Z-sections with the end vertical struts 23, 26, and 28. Additionally, the intermediate vertical struts 22 and 25, which cross the slant bars of the Z, serve as reinforcing supports for the ribs at the leading end section of the airfoil, which may, as in the illustrated showing, carry the main load of the structure. At the leading end of the rib, nose support strut 30 connects the opposed rib chords.

Figure 6:
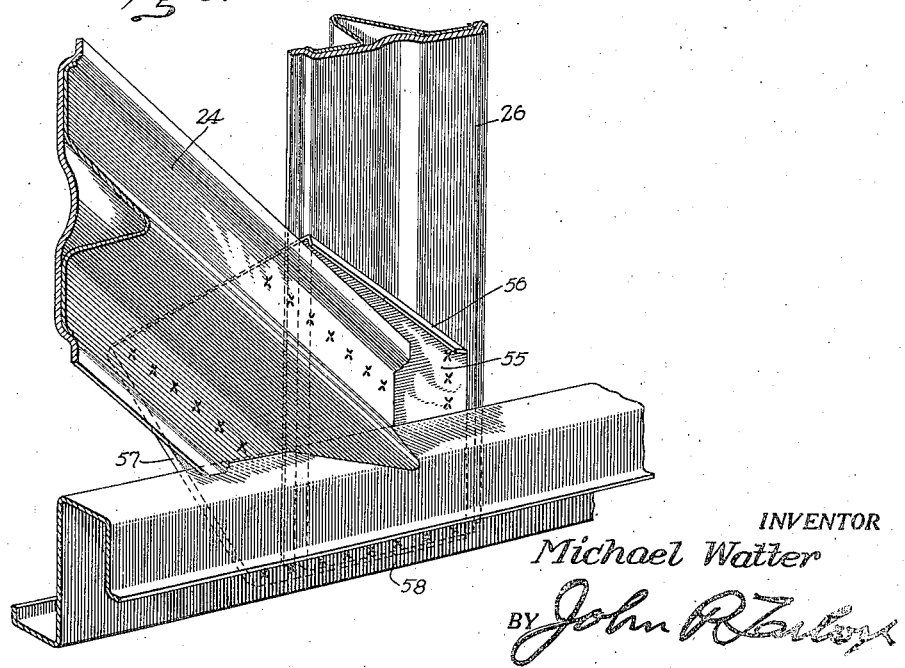
Fig. 6 is an enlarged perspective of the chord joint between diagonal and vertical truss members and rib cap strip.

At this point in the description it is advantageous to consider the structure of the struts 20, both diagonal and vertical struts having a similar formation. Referring to Figs. 2, 5, and 6 it appears that the strut 20 is formed in two strips. A V- or U-shaped or channel strip 40 and a channel closure strip 41, the channel closure strip, preferably, being of heavier stock and having a greater mass density than that of the U-strip 40. The U-strip 40 is deeply channelled with slightly diverging walls 42 and 43, the latter terminating in flat edge plates 44 and 45 coplanar as to each other, and having reversely turned edge flanges, 46 and 47. It may be designated as a "sombrero" or "hat" section member.

The strip 41 has coplanar parallel flat plates 48 and 49 joined by a shallow channel 50 and edged by sigmoid flanges 51 and 52, the flat areas 45, 48 and 44, 49 together with the curved areas 47, 52 and 46, 51 being in closely contiguous nesting relationship through spot weld attachment. It should be observed from Fig. 2 that, assuming the plane of plates 48 and 49 as a reference plane, the center of mass of the U-strip 40, after attachment to the strip 41, is displaced appreciably toward the reference plane by the mass of the strip 41, so that the distance of the center of mass of the strut from the plane 48—49 is quite short. This feature of the invention is of considerable importance as will appear hereinafter. All struts 20 including diagonals and verticals, have the described box or double strip construction. The composite strut may be designated as of "box-sombrero" section.

In applying the struts 20 to the rib chords 11 and 12 the vertical struts are placed on one side and the diagonal struts on the other side of a common intermediate plane. In the case of the verticals 22 and 25 which are not included in the series Z-truss structure, the flat base plates are spot welded directly to chord webs 17 (see Fig. 1).

In the case of the Z-truss, use is made of a gusset 55 roughly shaped as a pentagon, with the edges of two non-adjoining edges reversely out turned, as at 56 and 57. This gusset 55 is applied to the rib chord web 17, as shown in Figs. 3 and 6, with the base edge 58 parallel to the chord plate 15 and spot welded to the web. A diagonal, as 24, is then positioned with a bevelled end overlying the upper chord plate 16, and spot welded to the gusset 55.

The base of the vertical strut, as 26, is then applied to the inner side of the gusset with the end of the U-section 40 overlying the flange 18 of lower chord plate 15, and spot welded to the gusset. It is pointed out that the described sequence of assembly of the Z-joint is advantageous for the preferred construction herein illustrated since any other sequence would prevent proper access of welding tools to the parts to obtain the welds desired. It should be noted further that the struts 24 and 26 are placed, back to back, so that the masses due to U-sections 40 lie on opposite sides of the plane of attachment including the gusset. Back to back positioning occurs also in the engagement of diagonals 21 and 24 with the auxiliary vertical struts 22 and 25, as shown in Figs. 1 and 5.

Certain outstanding features of the invention now may be clearly perceived. As to the struts, the structure of nested channelled sections is such as reduce the distance of the center of mass of the strut from the base to a small value. The second feature is the balanced arrangement of struts, back to back. By this combined construction the moment of inertia of the individual strut with reference to the plane of attachment at the rib chord is kept very small; and further these moments for oppositely disposed struts tend to equalize each other. In this manner shear stresses are effectively diminished in the rib structure and the overall strength of the airfoil augmented.

It is observed further that if the thickness of the strip 41 be increased over that of U-strip 40, the resistance to "crippling" or buckling in the welded strip sections 49 may be increased, without substantial increase in the total strut weight. In other words by reducing the mass of the U-strip 40 and increasing the mass of the strip 41, greater buckling resistance may be obtained without increasing the weight of the strut.

Additionally, it is pointed out that the strut structure with the flat edge wings lends itself with marked facility to welding operations, either between trusses in back to back relationship or as connected to a gusset or chord in a rib or other truss structure. Also, the joint between diagonal and vertical struts, gusset and rib chords has important advantages in rigidity, ease of assembly, facility for spot welding and simplicity.

Finally the rib construction wherein the diagonal and vertical struts are welded together at the approximate mid-points insures adequate resistance against compressional and tensional forces.

While the above method and structures have been described in detail it should be understood that this description is illustrative and that variations of the procedure and invention may be made within the scope of the appended claims.

What is claimed is:

1. A truss comprising spaced chord members and connecting struts, said chord members having aligned webs to transmit loads in a common truss stress plane, said struts each being of closed box-section including a flanged U-shaped member and a plate-like cap member secured thereto through the flanges, the box-section strut being secured to the webs of said chord members on one side of and closely adjacent said stress plane with the cap member located adjacent the plane and the U-shaped member extending away from the said plane and the plate-like cap member being formed of relatively much thicker stock than the U-shaped member, whereby to bring the center of mass of the box-section strut closely adjacent the truss stress plane while at the same time providing great column strength in resistance to bending and to provide great overall lightness with great strength and stability.

2. A truss comprising spaced chord members and connecting struts, said chord members having aligned webs to transmit loads in a common truss stress plane, said struts each being of closed box-section including a flanged U-shaped member and a plate-like cap member secured thereto through the flanges, the box-section strut being secured to the webs of said chord members on one side of and closely adjacent said stress plane with the cap member located adjacent the plane and the U-shaped member extending away from the said plane and the plate-like cap member being formed of relatively much thicker stock than the U-shaped member, whereby to bring the center of mass of the box-section strut closely adjacent the truss stress plane while at the same time providing great column strength in resistance to bending and to provide great overall lightness with great strength and stability, said plate-like cap member also being formed in cross section of portions bent outward toward the center of mass of the composite strut to furnish still greater column strength and concentration of material about the center of mass near the inner face of the cap member.

3. A truss comprising spaced chord members and connecting struts, said chord members having aligned webs to transmit loads in a common truss stress plane, said struts each being of closed box-section including a flanged U-shaped member and a plate-like cap member secured thereto through the flanges, the box-section strut being secured to the webs of said chord members on one side of and closely adjacent said stress plane with the cap member located adjacent the plane and the U-shaped member extending away from the said plane and the plate-like cap member being formed of relatively much thicker stock than the U-shaped member, whereby to bring the center of mass of the box-section strut closely adjacent the truss stress plane while at the same time providing great column strength in resistance to bending and to provide great overall lightness with great strength and stability, the webs of said chord members being medially disposed and some of said struts being located on each side of the webs and the stress plane of the truss defined thereby, all of said struts having their cap members disposed inwardly and closely adjacent said truss stress plane.

4. A truss comprising spaced chord members and connecting struts, said chord members having aligned medial webs to transmit load in a common stress plane and reversely flanged lateral portions on opposite sides of said webs, said struts each being of closed box-section including a flanged U-shaped member and a flanged plate-like cap member secured to the U-shaped member through the flanges, the flanges of the cap member being bent back toward the U-shaped member, said cap member being of much thicker stock than the U-shaped member and having a channel portion bent into the interior of the U-shaped member, some of said struts being secured to the side of the chord webs on one side, gusset plates secured to the webs on the one side, some struts being secured to the sides of said gusset plates above the lateral portions on the other side of the web, and some of said struts being secured to said gusset plates on the one side of and overlapping said web, all of said struts being disposed with their cap members adjacent the truss stress plane and some of the oppositely disposed struts being secured together.

MICHAEL WATTER.